United States Patent
Uebayashi et al.

(10) Patent No.: US 6,485,837 B2
(45) Date of Patent: Nov. 26, 2002

(54) COATING COMPOSITION FOR POLYOLEFIN PRODUCTS AND POLYOLEFIN PRODUCTS COATED WITH SUCH COATING COMPOSITION

(75) Inventors: Mitsugi Uebayashi, Kobe (JP); Hidenori Shimizu, Kobe (JP)

(73) Assignee: Seikoh Chemicals Company, Limited, Kobe (JP)

( * ) Notice: Subject to any disclaimer, the term of this patent is extended or adjusted under 35 U.S.C. 154(b) by 0 days.

(21) Appl. No.: 09/766,145

(22) Filed: Jan. 19, 2001

(65) Prior Publication Data
US 2001/0011114 A1 Aug. 2, 2001

(30) Foreign Application Priority Data
Jan. 28, 2000 (JP) ......................................... 2000-020707

(51) Int. Cl.[7] .......................... B32B 27/36; B32B 27/40; C08C 19/22; C08F 8/30
(52) U.S. Cl. ..................... 428/424.8; 428/483; 525/374
(58) Field of Search ............................... 428/424.8, 483; 525/374

(56) References Cited

U.S. PATENT DOCUMENTS 6,103,327 A * 8/2000 Bragole et al.
6,248,819 B1 * 6/2001 Masuda et al.

FOREIGN PATENT DOCUMENTS

| JP | 63272547 A | 11/1988 |
| JP | 07247381 A | 9/1995 |
| JP | 07247382 A | 9/1995 |

* cited by examiner

*Primary Examiner*—Tae H. Yoon
(74) *Attorney, Agent, or Firm*—Duane Morris LLP

(57) ABSTRACT

A polyolefin product can be coated with a matte, uniform coating having good adherence, good solvent resistance, and good abrasion resistance. The coating includes a primary coating of a coating composition composed of a polymer solution or water dispersion of polyurethane or polyester in an amount of 100 parts by weight in solid content, and a polycarbodiimide compound in an amount of 2-100 parts by weight. A secondary coating is disposed on the primary coating. The secondary coating is formed from a solution of polyurethane with or without a carboxyl group.

6 Claims, 1 Drawing Sheet

TABLE

| | Composition for Primary Coating | Amount of Carbodiimide Compound, in Solid Content (parts by weight) | Composition for Secondary Coating | Adherence | Solvent Resistance | Shelf Stability of Primary Coating |
|---|---|---|---|---|---|---|
| Example 1 | A | 20 | None | 100/100 | 4 | Gelled in 30 minutes |
| Example 2 | B | 20 | None | 80/100 | 4 | Gelled in 30 minutes |
| Example 3 | B-1 | 20 | None | 100/100 | 4 | Gelled in 30 minutes |
| Example 4 | C | 27 | D | 100/100 | 3 | Stable for more than 24 hours |
| Example 5 | C | 27 | E | 100/100 | 5 | Stable for more than 24 hours |
| Example 6 | F | 83 | E | 100/100 | 5 | Stable for more than 24 hours |
| Example 7 | G | 25 | E | 100/100 | 4 | Stable for more than 24 hours |
| Example 8 | H | 13.4 | None | 100/100 | 4 | Stable for more than 24 hours |
| Example 9 | A | 20 | E | 100/100 | 5 | Gelled in 30 minutes |
| Comparison Example 1 | C-1 | 1.7 | D | 100/100 | 2 | Stable for more than 24 hours |
| Comparison Example 2 | C-2 | 133 | D | 60/100 | 3 | Stable for more than 24 hours |
| Comparison Example 3 | J | None | D | 100/100 | 1 | Stable for more than 24 hours |

COATING COMPOSITION FOR POLYOLEFIN PRODUCTS AND POLYOLEFIN PRODUCTS COATED WITH SUCH COATING COMPOSITION

This invention relates to a coating composition and, more particularly, to a coating composition suitable for providing polyolefin formed products, such as polyolefin sheets, with a uniform, matte coating which exhibits good adhesion to the products, good abrasion resistance, and good chemical resistance. The invention relates also to polyolefin products coated with such coating composition.

BACKGROUND OF THE INVENTION

Soft polyvinyl chloride is frequently used for sheets, from which, for example, interior furniture of automobiles is formed. However, soft polyvinyl chloride products are disadvantageously subject to discoloration and tend to become brittle due to a large amount of plasticizer used therein for providing softness to the products.

Recently, polyolefin, e.g. olefin thermoplastic elastomer, is frequently used in place of soft polyvinyl chloride because polyolefin itself is soft and, therefore, need not be softened by use of any plasticizer. In addition, polyolefin has a smaller specific gravity than soft polyvinyl chloride, which makes it possible to provide lighter products than soft polyvinyl chloride. Furthermore, polyolefin is recyclable.

An olefin thermoplastic elastomer used for forming, for example, interior furniture of automobiles, includes an ethylene-propylene copolymer, or an ethylene-propylene-diene terpolymer consisting of an ethylene-propylene copolymer and a third component having a partial bridge structure, with an antistatic agent, a thermostabilizer, an ultraviolet absorbing agent, a pigment etc. added to it.

Generally, it is difficult to apply a coating over the surface of a product of such olefin thermoplastic elastomer, and if a coating can be provided, the coating will have poor physical properties, such as poor adhesion and poor abrasion resistance. This is because the surface of polyolefin products is inactive.

In prior art, polyolefin products are provided with a coating by first activating the surface of a product with corona discharge, then, coating the activated surface with a chlorinated polyolefin primer or a two-pack curing primer including, for example, polyester and polyisocyanate, or polyurethane and polyisocyanate, and finally providing a top coating. Such a method is disclosed in Japanese Unexamined Patent Publication Nos. SHO 63-272547 A, HEI 7-247381 A and HEI 7-247382 A.

Recently, people tend toward higher class interior furniture for automobiles, and, therefore, furniture formed simply of olefin thermoplastic elastomer is hardly seen. For example, trim panels for automobiles are frequently formed of polyolefin sheet over which fabric or the like is bonded by an adhesive. Accordingly, surface treatment of polyolefin products must provide products with resistance against solvent in the adhesive used to bond fabric to polyolefin products and creep resistance against temperature within automobiles.

Accordingly, two-pack curing type coating compositions composed of polyester and polyisocyanate or polyurethane and polyisocyanate are used in many cases. However, recently, the use of polyisocyanate curing agents has raised problems in human health and safety. Further, two-pack curing type coating compositions in which polyisocyanate is used as a curing agent have a disadvantageously short pot life because the polyisocyanate curing agent, when it is mixed, increases the viscosity of the coating compositions.

SUMMARY OF THE INVENTION

According to the present invention, a coating composition for treating the surface of a polyolefin resin product is provided. The coating composition includes a curing agent of polycarbodiimide compound. The use of polycarbodiimide compound as the curing agent can solve the above-discussed various problems, and can provide a matte, uniform coating which exhibits good adhesion to a polyolefin product, good heat resistance, and good solvent resistance.

The coating composition according to the present invention is composed of 100 parts by weight in solid content of polymer solution or water dispersion essentially consisting of a polyurethane resin or a polyester resin, and from 2 to 100 parts by weight of a polycarbodiimide compound. The polymer solution or water dispersion is referred sometimes to as main component.

The polyurethane or polyester resin may contain a carboxyl group in an amount not greater than unity (1) in terms of acid value.

According to the present invention, a polyolefin product, e.g. a polyolefin sheet is coated with the coating composition with or without a carboxyl group.

A polyolefin product may be coated with primary and secondary coatings. The primary coating is formed by applying the above-described coating composition with or without a carboxyl group, over the surface of the product, and the secondary coating is formed by applying a polyurethane solution over the primary coating.

The polyurethane resin in the secondary coating may also contain carboxyl group.

Before applying the coating composition, the surface of the polyolefin product to be coated is preferably treated with corona discharge, which increases adhesion of the coating to the product surface.

The polycarbodiimide compound used as a curing agent in the present invention is a compound which includes a highly reactive carbodiimide group expressed as —N=C=N— in its main chain. The carbodiimide group reacts with an active hydrogen group, e.g. a carboxyl group, an amino group or an hydroxyl group, to thereby provide a cross-linked structure. In particular, the polycarbodiimide compound can react with the carboxyl group at normal temperature. When a polyurethane or polyester resin containing no carboxyl group is used for the main component of the coating composition, the adhesion of the resulting coating to a polyolefin product can be provided by treating the polyolefin product with corona discharge prior to the application of the coating composition. By corona discharge, an active group, e.g. a hydroxyl group or a carboxyl group, may be produced on the surface of the polyolefin product. The carbodiimide group in the polycarbodiimide compound in the coating composition reacts with such hydroxyl group or carboxyl group or with an amino group or a hydroxyl group or water in the main component, which makes the resulting coating adhere to the surface of the polyolefin product. The coating composition composed of the main component with no carboxyl group and a polycarbodiimide compound has no pot life problem.

On the other hand, by introducing a carboxyl group into the above-described main component of the coating composition, or by using a polyurethane or polyester resin having a carboxyl group, the polyurethane or polyester resin can rapidly crosslink with the carbodiimide group. This results in a coating having good solvent resistance and good abrasion resistance. However, the resulting coating composition with a carboxyl group is more or less unstable and short in pot life.

Knowing this-fact, the inventors have found that the amount of the carboxyl group in the. main component is preferably not greater than unity (1) in terms of acid value. A coating composition composed of the main component containing a carboxyl group in this: amount and a polycarbodiimide compound is applied over the surface of a polyolefin product to form a coating. Further, this coating may be used as a primary coating, over which a secondary coating of polyurethane is disposed. The polycarbodiimide compound in the primary coating moves into the secondary coating and reacts with a carboxyl group in the secondary coating. The resulting composite coating exhibits not only good adhesion to the polyolefin product but also good solvent resistance and good abrasion resistance.

A polycarbodiimide compound commercially available from Nisshinbo Industries, Inc., Japan or from Union Carbide, Inc., U.S.A. may be used as the polycarbodiimide compound in the present invention. As for the amount of the polycarbodiimide compound, when the polycarbodiimide resin in an amount of less than 2 parts by weight to 100 parts by weight of the main component in solid content is used, the resulting coating exhibits poor adhesion to a polyolefin product and insufficient solvent resistance. If the amount of the polycarbodiimide compound exceeds 100 parts by weight, the resulting coating exhibits satisfactory adhesion, but poor solvent resistance. Accordingly, the amount of the polycarbodiimide compound is from 2 to 100 parts by weight relative to 100 parts by weight of the main component in terms of solid content.

The polymer resin solution or water dispersion mainly composed of polyurethane or polyester resin may be provided by various combinations of materials. The polyurethane or polyester resin of the main component may be in the form of a blend with another polymer resin, or may be in the form of a copolymer or graft polymer with a monomer forming another polymer resin. For example, the polyurethane or polyester resin of the main component may be blended with chlorinated polyolefin resin, silicone resin, acrylic resin, epoxy resin, cellulose resin, nitrile rubber or other resin, depending on the use of the resulting coating composition. The resin of the main component may be in the form of a graft polymer with acrylic monomer or copolymer with reactive silicone resin.

The polyurethane resin solution of the main component can be manufactured by, for example, heating a polyol having a terminal hydroxyl group and having an average molecular weight of from about 500 to 5,000, in an organic solvent together with organic diisocyanate, and a chain extender. Such polyol may be polyester diol, polyether diol, lactone diol, or polycarbonate diol.

To prepare a solution of polyurethane resin with a carboxyl group, to be used as the main component, dimethylol propionic acid, which is a diglycolic acid, is preferably used as the chain extender.

The polyester diol useable in preparing the polyurethane resin for the coating composition of the present invention can be prepared by condensating a dicarboxylic acid with a diol. The dicarboxylic acid may be adipic acid, sebacic acid, terephthalic acid, or isophthalic acid, and the diol may be ethylene glycol, propylene glycol, 1,4-butanediol, 1,6-hexanediol, or neopentyl glycol.

The polyether diol may be polyethylene glycol, polytetramethylene glycol, or their copolymer ethers. The lactone diol may be polylactone diol prepared by ring-opening polymerization of ε-caprolactone. An example of the polycarbonate diol is polyhexamethylene carbonate diol.

The organic diisocyanate useable in the present invention may be 2,4 or 2,6-tolylenediisocyanate (TDI), 4,4'-diphenylmethane diisocyanate (MDI), hexamethylene diisocyanate (HDI), isophorone diisocyanate (IPDI), or 4,4'-dicyclohexylmethane diisocyanate ($H_2$MDI).

The chain extender may be diglycolic acid, or a diamine, e.g. ethylene diamine, isophorone diamine, 4,4'-diaminodicyclohexylmethane, hydrazine, or piperazine.

The organic solvent useable in the present invention may be dimethyl formamide (DMF), dimethyl acetamide, methyl ethyl ketone (MEK), acetone, toluene, xylene, dioxane, tetrahydrofuran, ethyl acetate, butyl acetate, isopropyl alcohol, or N-methyl pyrrolidone. These solvent may be used solely or in combination.

The polyester resin used as the main component of the coating composition of the present invention may the ones exemplified above as the materials for preparing the polyurethane resin, but its average molecular weight is preferably 10,000 or more.

BRIEF DESCRIPTION OF THE DRAWING

The sole FIGURE shows a table showing the result of a test conducted on coatings prepared in accordance with the present invention and some comparison examples.

DETAILED DESCRIPTION OF EMBODIMENTS

Now, the present invention is described by means of some embodiments.

First, how to prepare the main component of the coating composition of the present invention is described by means of some examples. The main component prepared is combined with a polycarbodiimide compound to form the coating composition of the present invention. In the following description, "part" represents "part by weight".

Polyurethane Polymer Solution PU-1

In a reaction vessel, 1,200 parts of polyhexamethylene carbonate diol having an average molecular weight of 2,000, 18 parts of 1,4-butane diol, 27 parts of dimethylol propionic acid (DMPA), and 444 parts of isophorone diisocyanate (IPDI.) were placed. Then, the materials were heated to react at 100° C. for three hours, while causing $N_2$ gas to flow in the vessel. After that, 1735 parts of DMF and 2602 parts of MEK were added to dilute the reaction product. When the temperature of the diluted liquid decreased down to 40° C., 170 parts of isophorone diamine (IPDA) was added little by little to increase the viscosity of the product, to thereby obtain a polyurethane polymer solution (PU-1) of which the solid resin content was 30% and which had a viscosity of 20,000 mPa·s/30° C.

Polyurethane Copolymer Solution PU-2

One thousand (1,000) parts of polyhexamethylene carbonate diol having an average molecular weight of 2,000 was placed in a reaction vessel, together with 1,000 parts of 1,6-hexane adipate having an average molecular weight of 2,000, 45 parts of 1,4-butane diol, and 524 parts of 4,4'-dicyclohexylmethane diisocyanate ($H_{12}$MDI). The materials were heated to react at 100° C. for two hours, while causing $N_2$ gas to flow in the vessel. After that, 2,477 parts of DMF and 3,716 parts of MEK were added to dilute the reaction product. When the temperature of the diluted solution decreased down to 40° C., 85 parts of IPDA was added little by little to thereby increase the viscosity of the diluted solution, which resulted in a polyurethane polymer solution (PU-2) of which the solid resin content was 30% and the viscosity was 15,000 mPa·s/30° C.

Polyurethane Polymer Solution PU-3

Polyhexamethylene carbonate diol having an average molecular weight of 2,000 in an amount of 1,200 parts was placed in a reaction vessel, together with 81 parts of 1,4-butane diol, 524 parts of $H_{12}MDI$, and 774 parts of toluene. The materials were heated at 100° C. for three hours, with $N_2$ gas flowing in the vessel. After that, 1,818 parts of DMF and 1,818 parts of MEK were added to dilute the reaction solution. When the temperature of the diluted solution became 40° C., 85 parts of IPDA was added little by little, which resulted in a polyurethane polymer solution (PU-3) of which the solid resin content was 30% and the viscosity was 22,000 mPa·s/30° C.

Polyurethane Polymer Solution PU-4

Polyhexamethylene carbonate diol having an average molecular weight of 2,000 in an amount of 1,200 parts was placed in a reaction vessel, together with 63 parts of 1,4-butane diol, 27 parts of dimethylol propionic acid (DMPA), 524 parts of $H_2MDI$, and 777 parts of toluene. The materials were heated at 100° C. for three hours, while causing $N_2$ gas to flow in the vessel. After that, 1,827 parts of DMF and 1,827 parts of MEK were added to dilute the reaction solution. When the temperature of the diluted solution became 40° C., 85 parts of IPDA was added little by little, which resulted in a polyurethane polymer solution (PU-4) of which the resin solid content was 30% and the viscosity was 22,000 mPa·s/30° C.

Polyester Polymer Solution PE-1

Neopentyl glycol in an amount of 114 parts, 130 parts of 1,6-hexane diol, 146 parts of adipic acid, and 166 parts of isophthalic acid were placed in a reaction vessel and heated at a temperature of 200–220° C., while causing $N_2$ gas to flow in the vessel. Then, the reaction solution was subjected to dehydration reaction, and, after that, the solution was further dehydrated under reduced pressure. The heating was stopped eight hours after the start of the reaction, where the reaction solution exhibited an acid value of 0.8 and a hydroxyl value of 6. The reaction solution was cooled down to a temperature of 120° C., and, then, 556 parts of xylol was added. The resultant polyester polymer solution (PE-1) exhibited a viscosity of 6,000 mPa·s/30° C. with a solid resin content of 50%.

Polyurethane Water Dispersion PUEM-1

Polyhexamethylene carbonate diol having an average molecular weight of 2,000 in an amount of 1,200 parts was placed in a reaction vessel, together with 18 parts of 1,4-butane diol, 67 parts of dimethylol propionic acid (DMPA), 444 parts of IPDI, and 305 parts of N-methyl pyrrolidone. The materials were heated at 100° C. for three hours with $N_2$ gas flowing in the vessel. Then, the interior of the vessel was cooled down to 50° C., and 51 parts of triethylamine was added. The resulting reaction solution was poured little by little into 3,076 parts of water in another vessel, while stirring. The stirring was continued until a uniform water dispersion resulted. Then, 119 parts of IPDA was added, which resulted in a polyurethane water dispersion (PUEM-1) the solid resin content was 35%.

Polyolefin products were coated with the polyurethane or polyester solution or water dispersion prepared in the above-described manner.

EXAMPLE 1

A solvent consisting of a mixture of MEK and DMF in a ratio of 2:1 was added to dilute the polyurethane polymer solution PU-1 the resin solid content of which was 30%, resulting in the reduction of the solid content to 15%. A polycarbodiimide compound (Carbodilite V-09 manufactured by Nisshinbo Industries, Inc., the amount of the effective component of which was 50% in an amount of 6 parts, and 3 parts of silica powder were added to 100 parts of the diluted PU-1 solution. The solution was stirred well to produce a coating composition A.

A thermoplastic polyolefin sheet was surface activated with corona discharge to have a wetting index of 45 dyne/cm. The coating composition A was applied twice over the surface of the polyolefin sheet by means of a gravure coater with an engraved roll with a mesh pattern of a mesh size of 120. The applied coating composition A was dried at 100° C. for 60 seconds, which resulted in a polyurethane coating on the polyolefin sheet. The surface of the coating was embossed at 180° C.

EXAMPLE 2

A coating composition B was prepared by the same processing as Example 1, except that in place of Carbodilite V-09, UCARLNK, Crosslinker XL-29SE manufactured by Union Carbide, Inc. was used. The amount of the effective component in this polycarbodiimide compound UCARLNK, Crosslinker XL-29SE was 50%.

A coating of the coating composition B was formed on the surface of a thermoplastic polyolefin sheet and embossed, in the same manner as described with respect to Example 1.

EXAMPLE 3

A coating composition B-1 was prepared by the same processing as Example 2, except that 10 parts of chlorinated polyolefin (Hardlen 13LB manufactured by Toyo Kasei Kogyo Co., Ltd., the chlorine content and the solid content of which were 26% and 30%, respectively) was blended with 80parts of the diluted PU-1 solution used in Examples 1 and 2. A polyolefin sheet with an. embossed coating of the coating composition B-1 was prepared in the same manner as described with reference to Example 1.

EXAMPLE 4

A solvent consisting of a mixture of MEK and DMF in a ratio of 2:1 was added to dilute the polyurethane polymer solution PU-2 the solid resin content of which was 30%, resulting in the reduction of the solid content to 15%. Eight (8) parts of polycarbodiimide compound XL-29SE, the amount of the effective component of which was 50%, and 3 parts of silica powder were added to 100 parts of the diluted PU-2 solution. The solution was stirred well to produce a coating composition C.

A thermoplastic polyolefin sheet was surface activated with corona discharge to have a wetting index of 45 dyne/cm. The coating composition C was applied once over the surface of the polyolefin sheet by means of a gravure coater with an engraved roll with a mesh pattern of a mesh size of 120. The composition C was dried at 100° C. for 60 seconds, which resulted in a primary coating of polyurethane on the polyolefin sheet.

A solvent consisting of a mixture of MEK and DMF in a ratio of 2:1 was added to dilute the polyurethane polymer solution PU-3 the solid resin content of which was 30%, resulting in the reduction of the solid content to 15%. Four (4) parts of silica powder were added to 100 parts of the diluted PU-3 solution. The solution was stirred well to produce a coating composition D. The coating composition D was applied twice over the surface of the primary coating of polyurethane by means of a gravure coater with an engraved roll with a mesh pattern of a mesh size of 120. The applied coating composition D was dried at 100° C. for 60 seconds, which resulted in a coating over the primary coating. The surface of the coating was embossed at 180° C., resulting in a secondary coating over the primary coating.

EXAMPLE 5

A coating composition E was prepared by diluting the polyurethane polymer solution PU-4 of which the solid resin content was 30%, with a solvent of a mixture of MEK and DMF in a ratio of 2:1 so that the solid content was reduced to 15%. Four (4) parts of silica powder was added to 100 parts of the diluted PU-4. The solution was stirred well, which resulted in the coating composition E.

A primary coating of the composition C used in Example 4 was formed on a thermoplastic polyolefin sheet in the manner as described with reference to Example 4. The same technique as Example 4 was employed to apply the coating composition E over this primary coating of the. composition C to thereby form a secondary coating and to emboss the secondary coating.

EXAMPLE 6

The polyurethane polymer solution PU-2 of which the solid resin content was 30% was diluted with a solvent of a mixture of MEK and DMF in a ratio of 2:1 so that the solid content was reduced to 15%. Twenty-five (25) parts of polycarbodiimide XL-29SE, of which the amount of the effective component was 50%, and 3 parts of silica powder were added to 100 parts of the diluted PU-2 solution. The solution was stirred well, and a coating composition F resulted. The coating composition F was applied once over the surface of a thermoplastic polyolefin sheet surface activated with corona discharge,. by means of a gravure coater with an engraved roll with a mesh pattern of a mesh size of 120. The applied coating composition F was dried at 100° C. for 60 seconds, which resulted in a primary coating of the coating composition F over the surface of the polyolefin sheet. The coating composition E prepared in the manner as described with reference to. Example 5 was applied over the primary coating and embossed in the same manner as Example 4, which resulted in a secondary coating of the coating composition E over the primary coating of the composition F.

EXAMPLE 7

The polyester polymer solution PE-1 of which the solid resin content was 50% was diluted with a solvent of a mixture of MEK and DMF in a ratio of 2:1 so that the solid content decreased to 20%. Ten (10) parts of polycarbodiimide compound V-09, the amount of effective component of which was 50%, and 4 parts of silica powder were added to 100 parts of the diluted PE-1 solution and stirred well, which resulted in a coating composition G. The coating composition G was applied once over the surface of a thermoplastic polyolefin sheet surface activated with corona discharge, by means of a gravure coater with an engraved roll with a mesh pattern of a mesh size of 120. The applied coating composition G was dried at 100° C. for 60 seconds, which resulted in a primary coating of the coating composition G over the surface of the polyolefin sheet. The coating composition E prepared in the manner as described with reference to Example 5 was applied over the primary coating and embossed in the same manner as Example 4, which resulted in a secondary coating of the coating composition E over the primary coating of the composition G.

EXAMPLE 8

An aqueous polycarbodiimide compound (Carbodilite V-02 available from Nisshinbo Industries, Inc., of which the amount of effective component was 40%) in an amount of 12 parts and 7 parts of silica powder were added to 100 parts of polyurethane water dispersion PUEM-1 of which the solid resin content was 35%, and stirred well to provide a coating composition H. The coating composition H was applied twice over the surface of a thermoplastic polyolefin sheet surface activated with corona discharge, by means of a gravure coater with an engraved roll with a mesh pattern of a mesh size of 120. The applied coating composition H was dried at 100° C. for 60 seconds, which resulted in a coating of the coating composition H over the surface of the polyolefin sheet. The coating was embossed at 180° C.

EXAMPLE 9

The coating composition A prepared in Example 1 was applied once over the surface of a thermoplastic polyolefin sheet activated by corona discharge, by means of a gravure coater with an engraved roll with a mesh pattern of a mesh size of 120. The applied coating composition A was dried at 100° C. for 60 seconds, which resulted. in a primary coating of the coating composition A over the surface of the polyolefin sheet. Then, the coating composition E prepared in Example 5 was applied over the primary coating in the same manner as the secondary coating in Example 4, which resulted in a secondary coating of the composition E over the primary coating of the composition A. The secondary coating was embossed in the same manner as the secondary coating of Example 4.

Comparison Example 1

Primary and secondary coatings were formed on a surface of a polyolefin sheet in the same manner as Example 4, except that a coating composition C-1 was used in place of the coating composition C. The composition C-1 was prepared by changing the amount of the polycarbodiimide compound XL-29SE to 100 parts of the diluted PU-2 solution from 8 parts of Example 4 to 0.5 parts.

Comparison Example 2

Primary and secondary coatings formed on a surface of a polyolefin sheet in the same manner as Example 4, except that a coating composition C-2 was used in place of the coating composition C. The composition C-2 was prepared by changing the amount of the polycarbodiimide compound XL-29SE to 100 parts of the diluted PU-2 solution from 8 parts of Example 4 to 40 parts.

Comparison Example 3

A coating composition J was prepared by mixing, 3 parts of silica powder with 100 parts of a toluene solution of chlorinated polypropylene whose chlorine content was 25%, while stirring well the solution. The solid content of the toluene solution was 20%. The coating composition J was applied once over the surface of a thermoplastic polyolefin sheet activated by corona discharge, by means of a gravure coater with an engraved roll-with a mesh pattern of a mesh size of 120. The applied coating composition J was dried at 100° C. for 60 seconds, which resulted in a primary coating of the coating composition J over the surface of the polyolefin sheet. Then, the coating composition D prepared in Example 4 was applied over the primary coating in the same manner as the secondary coating in Example 4, which resulted in a secondary coating of the composition D over the primary coating of the composition J. The secondary coating was embossed in the same manner as the secondary coating of Example 4.

Test

The thermoplastic polyolefin sheets with the resin coatings of Examples 1–9 and Comparison. Examples 1–3 were tested on their adherence and solvent resistance, and the shelf stability of the compositions of the primary coatings, i.e. the coatings disposed directly on the polyolefin sheets. The result of the test is shown in the TABLE in the sole FIGURE. The test was carried out in the following manner.

Adherence Test

A first set of eleven parallel lines with a spacing of 2 mm were cut in the surfaces of the coatings, and another set of similar eleven lines were cut to extend perpendicular to the first set, whereby one hundred (100) separate coating squares were formed in the surface of each coating. A piece of Scotch tape was pressed against the surfaces of the 100 squares, and, then, pulled off quickly. The numbers of the squares left after the tapes was pulled off are expressed in the TABLE as, for example, "100/100" when no squares were peeled off, as "60/100" when 60 squares were left and 40 squares were peeled off.

Solvent Resistance Test

A cotton swab impregnated with industrial gasoline was reciprocated ten (10) times to wipe the coating surfaces, while pressing it against the coating surfaces with a given force. After that, the surface state was examined and ranked in the following manner.

5: No change was seen.

4: The top coatings were slightly whitened.

3: Portions of the top coatings were peeled off.

2: Extreme whitening and peeling were seen in the top coatings.

1: The top coatings were completely peeled off.

The test result indicates that the coatings composed of a primary coating and a secondary coating disposed on the primary coating of Examples 4–9 have good properties. The coating composition of the primary coating was composed of 100 parts by weight in solid content of a polymer solution or water dispersion essentially consisting of a polyurethane resin or a polyester resin, and from 2 to 100 parts by weight of a polycarbodiimide compound. The coating composition of the secondary coating was composed of a solution of polyurethane having a carboxyl group.

The coatings of Examples 1–3 which did not have a secondary coating thereon exhibited satisfactory properties, although their shelf stability was less satisfactory. That is, the coating compositions of Examples 1–3 gelled in thirty (30) minutes after the preparation.

In contrast, the coatings formed of the coating compositions C-1 and C-2 of Comparison Examples 1 and 2, which contained a polycarbodiimide compound in an amount which is outside the range defined by the present invention, exhibited good adherence but poor solvent resistance.

As described above, the coating composition according to the present invention, which is composed of 100 parts by weight in solid content of a polymer solution or water dispersion essentially consisting of a polyurethane resin or a polyester resin, and from 2 to 100 parts by weight of a polycarbodiimide compound, can provide a matte, uniform coating which exhibits good adhesion to a polyolefin product, good solvent resistance, and good abrasion resistance.

Further, it has been found that a coating including this coating used as a primary coating, and a secondary coating formed of a coating composition including a solution of polyurethane with or without a carboxyl group, can further improve the coating properties.

What is claimed is:

1. A polyolefin product coated with a coating composition comprising 100 parts by weight in solid content of solution or water dispersion essentially consisting of polyurethane or polyester containing a carboxyl group in an amount of not greater than unity in terms of acid value, and from 2 to 100 parts by weight of a polycarbodiimide compound.

2. A polyolefin product coated with a primary coating of a coating composition comprising 100 parts by weight in solid content of solution or water dispersion essentially consisting of polyurethane or polyester, and from 2 to 100 parts by weight of a polycarbodiimide compound; and a secondary coating of a coating composition comprising polyurethane disposed on said primary coating.

3. A polyolefin product coated with a primary coating of a coating composition comprising 100 parts by weight in solid content of solution or water dispersion essentially consisting of polyurethane or polyester containing a carboxyl group in an amount of not greater than unity in terms of acid value, and from 2 to 100 parts by weight of a polycarbodiimide compound; and a secondary coating of a coating composition comprising polyurethane disposed on said primary coating.

4. The polyolefin product according to claim 2 wherein the polyurethane of said secondary coating contains a carboxyl group.

5. The polyolefin product according to claim 3 wherein the polyurethane of said secondary coating contains a carboxyl group.

6. A polyolefin product coated with a coating composition comprising 100parts by weight in solid content of solution or water dispersion essentially consisting of polyester, and from 2 to 100 parts by weight of a polycarbodiimide compound.

* * * * *